Patented Feb. 9, 1943

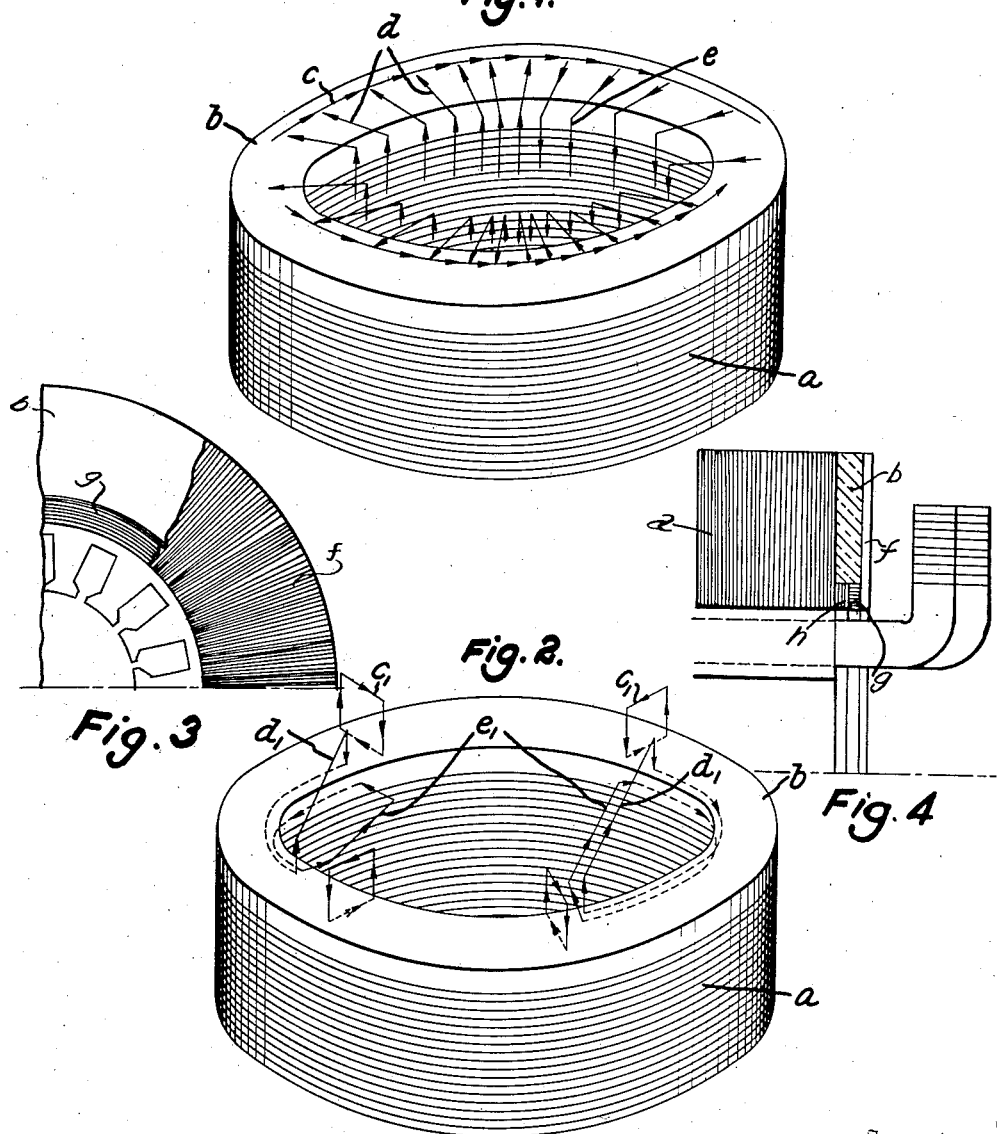

2,310,501

UNITED STATES PATENT OFFICE 2,310,501

DEVICE FOR REDUCING EDDY CURRENT LOSSES IN STATOR END PLATES

Paul Waldvogel, Baden, Switzerland, assignor to Aktiengesellschaft Brown, Boveri & Cie., Baden, Switzerland Application March 10, 1941, Serial No. 382,640
In Switzerland April 6, 1940

6 Claims. (Cl. 171—252)

It is known that the active laminations of machine stators are fixed mechanically between two solid end plates. Very high eddy current losses can, however, occur in these end plates due to rotating (three-phase current) or pulsating (alternating current) leakage fields inducing eddy currents in these solid metal parts. This phenomena is most pronounced in large bipolar turbo-generators. In order to suppress these losses completely it has already been proposed to make the end plates of a material which is electrically non-conductive. This, however, merely causes a displacement of the eddy currents and they then occur in the outer dynamo laminations, so that the same problem as before arises. This solution could therefore not be adopted in practice.

Another possibility is to damp the rotating or pulsating leakage fields by means of conductive screen plates or compensating windings so that the end plates which lie underneath are protected from the effects of these leakage fields. In order to obtain the desired effect in practice such devices must, however, be very massive with the result that their own losses are always higher than those which have been eliminated from the end plates.

The object of the present invention is to avoid the aforementioned losses by other means which are extremely simple. According to the invention this is achieved by applying a material to the end plates which possesses a high magnetic conductivity and a high electrical resistance. Dynamo laminations are particularly suitable for this purpose these being arranged on the end plates in such a manner that the plane in which the laminations lie is as near as possible perpendicular to the primary ampere turns, so that magnetic resistance to permeation by the lines of force is a minimum, whilst at the same time the formation of eddy currents is prevented by as large an electrical resistance as possible. The leakage lines are thus suppressed by the dynamo laminations when arranged in the manner described and the end plates freed from eddy current losses.

The invention is explained in greater detail with reference to the accompanying drawing in which Fig. 1 is an axometric representation of a bipolar machine stator, Fig. 2 shows the course of the leakage fields, Fig. 3 a top plan view of the stator with layers broken away to show the structure, and Fig. 4 is a section in a plane through the axis of the stator. In Fig. 1 the stator laminations $a$ are held together by the end plate $b$. The instantaneous values of the exciting ampere turns with a single-phase supply are for the sake of clearness divided into components and indicated by arrows, $c$ being the tangential, $d$ the radial and $e$ the axial components of the stator ampere turns which produce leakage fields in the end plate $b$ and cause eddy current losses.

The paths followed by the leakage fields are shown in Fig. 2, these being also divided into components as in Fig. 1. This therefore results in leakage field lines $c_1$ of the tangential current component $c$, leakage field lines $d_1$ of the radial current component $d$ and the leakage field lines $e_1$ of the axial current component $e$, the path through the iron itself being indicated by the broken lines. It is thus obvious that the leakage lines follow paths in the radial plane, along the peripheral surface of the cylinder, and in the plane perpendicular to the axis. In order to prevent or at least greatly reduce the formation of eddy currents in the end plate $b$ dynamo laminations or similar devices are thus arranged in the aforementioned planes so that a path is provided for the leakage lines which keeps them away from the end plate. These laminations $f$, $g$ and $h$ are shown in Figs. 3 and 4. Laminations $f$ stand perpendicular to the end plate $b$ and lie in the radial planes which pass through the axis of the stator. Laminations $g$ lie perpendicular to the end plate $b$ and parallel to the peripheral surface of the stator and laminations $h$ lie parallel to the end plate $b$ in planes perpendicular to the axis of the stator.

In some cases it will be sufficient if laminations for removing the leakage lines are only provided in the radial plane on the surface of the end plate. A very considerable reduction in eddy current losses can already be achieved if the laminations used are only a few millimetres thick, that is to say a fraction of the thickness of the end plate, because normally the leakage flux only penetrates into the solid end plate to a very small depth.

The present invention is of course not restricted to the use of dynamo laminations. Any magnetic material having a high electrical resistance can be used. This material can be applied in the form of a complete or partial covering for the end plate. Such a covering does not require any mechanical strength because the entire mechanical strain is taken by the end plate itself.

I claim:

1. A device for reducing eddy current losses in the end plates of a machine stator, characterised by the end plates having an axially exterior layer of a material of high magnetic conductivity and high electrical resistance.

2. Device as in claim 1, characterised by the feature that the material is fixed on the end plates in such a manner that the planes in which the layers of the material lie are as far as possible perpendicular to the primary ampere turns.

3. Device as in claim 1, characterised by the feature that dynamo laminations are arranged on the end plates, the planes of said laminations being located in the radial plane, along the peripheral surface and in the plane perpendicular to the axis of said end plates.

4. Device as in claim 1, characterised by the feature that the end plates are at least partially covered with a magnetic material having a high electric resistance.

5. Device as in claim 1, characterized by the feature that dynamo laminations are arranged only on the end surfaces of the end plates in such a manner that the planes in which the laminations lie are as far as possible perpendicular to the primary ampere turns.

6. Device as in claim 1 in which dynamo laminations having a thickness of only a fraction of the thickness of the end plates are arranged on the end plates, the planes of said laminations being located in the radial planes perpendicular to the end plates.

PAUL WALDVOGEL.